United States Patent Office.

ADOLPHUS F. BISHOP, OF NORWALK, CONNECTICUT, JOHN M. PENDLETON, OF NEW YORK, N. Y., AND JOHN H. AIKEN, OF NORWALK, CONNECTICUT.

Letters Patent No. 81,740, dated September 1, 1868.

IMPROVED FIBRE-AND-GUM FABRIC.

The Schedule referred to in these Letters Patent and making part of the same.

TO ALL WHOM IT MAY CONCERN:

Be it known that we, ADOLPHUS F. BISHOP, of Norwalk, in the county of Fairfield, and State of Connecticut, JOHN M. PENDLETON, of New York city, in the State of New York, and JOHN H. AIKEN, of Norwalk, aforesaid, have invented certain new and useful Improvements in the Manufacture of Fabrics or Goods of Combined Fibre and Rubber; and we do hereby declare that the following is a full and exact description thereof.

Our improved goods are intended for the soles and uppers of boots and shoes, and for various other uses where leather or analogous material is employed. We believe it may serve well as driving-straps or belts for machinery.

Our invention consists in associating fibre properly together with rubber cement and sulphur, in the manner hereinafter set forth, and vulcanizing it in place.

We will proceed to describe what we consider the best means for carrying out our invention.

We first make a sheet of felt by laying the wool crosswise, at right angles, or otherwise associating it and compacting or felting it together with a jigger or other machinery adapted for the purpose. We then saturate it with rubber cement containing a proper quantity of sulphur, litharge, &c., to secure proper vulcanization, effecting this by running it slowly through a vessel containing the cement, squeezing it one or more times between rollers, or in any other way which will cause the rubber cement to thoroughly permeate the felt.

What we conceive to be the very best method in practice is, to cut the articles in shape from felt, by machinery or otherwise. Thus, for example, if soles are to be produced, we cut the soles in exactly the right form. We then lay them in flat moulds, of corresponding form, containing a sufficient quantity of rubber cement, and lay upon the upper face of the dry felt a follower or top piece of the same form as the sole, but perforated with numerous small holes. We then press down the follower by means of a screw-press, or otherwise, and hold it under pressure for a little time, until the rubber cement is visible through all the holes in the follower. We then relax the pressure, and the felt is found to be properly saturated.

The next operation is the vulcanizing. This is effected at a temperature corresponding to the use to which the material is to be subjected, preferring as low a temperature as will suffice. We have made soles in a tolerably satisfactory manner by vulcanizing at a temperature of ordinary steam, say an available heat of 180° Fahrenheit, which was the highest temperature available with the imperfect apparatus then at command. It is preferable to confining the material in a perforated mould of corresponding shape while the vulcanizing is being effected.

The material thus made has a thickness approximating very closely to that of good leather. It absorbs water, but only in very small quantities. A sole weighing three hundred grains, increased in weight only fifty grains by immersion in water over night, and only five grains more by immersion for several days. Its qualities in regard to friction on ice make it very desirable for outer soles. Ordinary rubber adheres well to dry ice, but slips on wet ice. Leather slips on both, but our material makes it safe walking on either dry or wet ice.

The hardness of the felt and the stiffness of the rubber composition may be varied, and the product will vary correspondingly. By thinning our rubber cement with naphtha, or analogous material, we can give as small a quantity of the rubber as may be desired, and a very small quantity will change the character of the felt very materially; but we prefer, in most cases, to apply the rubber cement in as thick a condition as is practicable, using it in a consistency thicker than the thickest molasses in cold weather. We propose, in some instances, to saturate our material two or more times, either in the same or in different thicknesses of the rubber cement.

Some of the advantages of our invention may be secured by packing the wool in the proper form, and saturating and vulcanizing as above described, without a previous felting of the fibre. Or, instead of wool, shoddy, which is fibre obtained by tearing in pieces old woollen goods, or flock, which is obtained by shearing the surface of woollen cloth and other woollen goods, may be used with advantage, alone or in admixture. To employ flock in this manner, we stir it, in proper quantities, into the pasty rubber cement, and mould it into the forms required, vulcanizing it afterwards in the same or different moulds. We believe that cotton, linen, and, in short, all kinds of fibre, may be used as a part of the fibrous material in our goods, in the manner last described.

We propose to try gutta percha, or the compounds of rubber, or allied gums, in place of what is here referred to as rubber cement. We use the term "rubber cement" to indicate the compounds of vulcanizable gum with solvents and adulterating-materials, which are commonly known in the rubber-manufacture.

Having now fully described our invention, what we claim as new, and desire to secure by Letters Patent, is as follows:

We claim the within-described compound of fibre and rubber cement, formed in the proper shapes, and vulcanized, as and for the purposes herein set forth.

ADOLPHUS F. BISHOP,
JOHN M. PENDLETON,
JOHN H. AIKEN.

Witnesses:
  JOSEPH F. FOOTE,
  HENRY ALLEN.